(12) United States Patent
Achor et al.

(10) Patent No.: US 8,371,271 B2
(45) Date of Patent: Feb. 12, 2013

(54) VAPOR VENT CONTROL APPARATUS, SYSTEM AND OUTBOARD MARINE ENGINE THEREWITH

(75) Inventors: Kyle D. Achor, Monticello, IN (US); Richard Harvey, Logansport, IN (US)

(73) Assignee: Federal-Mogul Corporation, Southfield, MI (US)

( * ) Notice: Subject to any disclaimer, the term of this patent is extended or adjusted under 35 U.S.C. 154(b) by 333 days.

(21) Appl. No.: 12/604,538

(22) Filed: Oct. 23, 2009

(65) Prior Publication Data

US 2010/0102257 A1 Apr. 29, 2010

Related U.S. Application Data

(60) Provisional application No. 61/108,052, filed on Oct. 24, 2008.

(51) Int. Cl.
*F02M 37/20* (2006.01)
*F02M 37/00* (2006.01)
*F16K 24/00* (2006.01)

(52) U.S. Cl. .......... 123/516; 123/510; 137/587

(58) Field of Classification Search .......... 123/510, 123/516, 518, 520, 468, 469, 198 D; 137/322, 137/587, 588, 589; 285/124.1, 124.4
See application file for complete search history.

(56) References Cited

U.S. PATENT DOCUMENTS

| | | | |
|---|---|---|---|
| 3,409,040 A * | 11/1968 | Weston et al. ............... | 137/572 |
| 3,521,679 A | 7/1970 | Copony | |
| 4,195,673 A | 4/1980 | Johnston et al. | |
| 4,269,219 A * | 5/1981 | Dybvig ..................... | 137/322 |
| 4,502,516 A | 3/1985 | Shields | |
| 4,506,649 A | 3/1985 | Hunt et al. | |
| 4,911,203 A | 3/1990 | Garms | |
| 5,640,724 A | 6/1997 | Holmes | |
| 6,092,545 A | 7/2000 | Bedore et al. | |
| 6,318,344 B1 | 11/2001 | Lucier et al. | |

FOREIGN PATENT DOCUMENTS

| | | |
|---|---|---|
| JP | 08-338218 A | 12/1996 |
| JP | 10-220671 A | 8/1998 |
| JP | 2008-101588 A | 5/2008 |

* cited by examiner

*Primary Examiner* — Stephen K Cronin
*Assistant Examiner* — Sherman Manley
(74) *Attorney, Agent, or Firm* — Robert L. Stearns; Dickinson Wright, PLLC

(57) ABSTRACT

An outboard marine engine has vapor vent control apparatus including a fuel inlet in fluid communication with a fuel reservoir of the engine. The fuel inlet is operably attachable to a fuel pin of a fuel connector. When attached, liquid fuel flows to the fuel reservoir and when detached, liquid fuel flow out of the fuel inlet is prevented. A vapor vent passage is configured in fluid communication with the liquid fuel reservoir and an air intake of the engine. A vent pin is disposed in the vapor vent passage. The vent pin moves between a first position upon attaching the fuel connector to the fuel inlet and a second position upon detaching the fuel connector from the fuel inlet. In the first position, the vapor vent passage is open to fuel vapor flow and, when in the second position, the vapor vent passage is closed to fuel vapor flow.

16 Claims, 5 Drawing Sheets

VAPOR VENT CONTROL APPARATUS, SYSTEM AND OUTBOARD MARINE ENGINE THEREWITH

CROSS-REFERENCE TO RELATED APPLICATION

This application claims the benefit of U.S. Provisional Application Ser. No. 61/108,052, filed Oct. 24, 2008, which is incorporated herein by reference in its entirety.

BACKGROUND OF THE INVENTION

1. Technical Field

This invention relates generally to internal combustion engines, and more particularly to vapor vent systems for outboard marine fuel injected engines vent systems.

2. Related Art

Outboard marine fuel injected internal combustion engines require liquid fuel to be injected through fuel injectors for the engine to run. Typically, to avoid fuel vapor from being directed to the fuel injectors, the engines include a vapor vent passage extending from a fuel reservoir to an air intake of the engine. To regulate the flow of fuel vapor to the air intake, a float mechanism is typically provided in the reservoir. Small outboard marine engines commonly have a source of liquid fuel maintained in a fuel tank that is attachable and detachable to a fuel inlet of the engine via a fuel connector. Upon detaching the fuel connector from the fuel inlet of the engine, a supply of liquid fuel and fuel vapor is maintained in the engine fuel system. The liquid fuel is typically prevented from leaking back out of the fuel inlet of the engine via a spring biased ball valve. The liquid fuel and fuel vapor are typically inhibited from passing to the air intake via the float mechanism.

It is common to remove outboard marine engines from boats, such as during off-season, during service, or at other desired times. When removed, the engine is often laid on its side, or in a position other than upright, such as the position typically maintained while attached to the boat. Further, the engine can be exposed to elevated thermal conditions, such as while in storage. When the engine is on its side and/or subjected to elevated thermal conditions, the aforementioned float mechanism that is intended to inhibit liquid fuel and fuel vapor from passing to the air intake may be prevented from functioning. While on its side, or exposed to heat, the affects of gravity and/or increased pressure within the fuel system can cause the float mechanism to allow liquid fuel and/or vapor to pass thereby and into the air intake of the engine.

SUMMARY OF THE INVENTION

In accordance with one aspect of the invention, an outboard marine engine vapor vent control apparatus is provided. The apparatus includes a fuel inlet configured in fluid communication with a fuel reservoir of the engine. The fuel inlet has a one-way valve, wherein the fuel inlet is configured for operable attachment to a fuel pin of a fuel connector. When attached to the fuel pin, the one-way valve automatically moves to an open position to allow liquid fuel to flow through the one-way valve to the fuel reservoir and when detached from the fuel pin the one-way valve automatically moves to a closed position to prevent the flow of liquid fuel out of the fuel inlet. A vapor vent passage is configured in fluid communication with the liquid fuel reservoir and an air intake of the engine. A vent pin is disposed in the vapor vent passage. The vent pin is automatically movable between a first position upon attaching the fuel connector to the fuel inlet and a second position upon detaching the fuel connector from the fuel inlet. When in the first position, the vapor vent passage is open to fuel vapor flow and, when in the second position, the vapor vent passage is closed to fuel vapor flow.

In accordance with one aspect of the invention, an outboard marine engine vapor vent control system is provided. The system includes a fuel connector having an elongate fuel pin with a fuel passage. Further, a body having a fuel inlet is configured in fluid communication with a liquid fuel reservoir of the engine. The fuel inlet has a one-way valve disposed therein. The fuel inlet is configured for receipt of the fuel pin and, when attached to the fuel pin, the one-way valve automatically moves to an open position to allow liquid fuel to flow through the one-way valve to the fuel reservoir and, when detached from the fuel pin, the one-way valve automatically moves to a closed position to prevent the flow of liquid fuel out of the fuel inlet. Further, a vapor vent passage is configured in fluid communication with the liquid fuel reservoir and an air intake of the engine. A vent pin is disposed in the vapor vent passage. The vent pin is automatically movable between a first position upon attaching the fuel connector to the fuel inlet and a second position upon detaching the fuel connector from the fuel inlet. When in the first position, the vapor vent passage is opened to fuel vapor flow and, when in the second position, the vapor vent passage is closed to fuel vapor flow.

In accordance with one aspect of the invention, an outboard marine engine in combination with an external fuel tank is provided, wherein a fuel line extends from the fuel tank to a fuel connector having an elongate fuel pin configured for attachment to the outboard marine engine. A fuel inlet is configured in fluid communication with a liquid fuel reservoir of the engine and, the fuel inlet is configured for receipt of the fuel pin to allow liquid fuel to flow to the fuel reservoir. A vapor vent passage is configured in fluid communication with the liquid fuel reservoir and an air intake of the engine. A vent pin is disposed in the vapor vent passage. The vent pin is automatically movable between a first position upon attaching the fuel connector to the fuel inlet and a second position upon detaching the fuel connector from the fuel inlet. When in the first position, the vapor vent passage is open to fuel vapor flow and, when in the second position, the vapor vent passage is closed to fuel vapor flow.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
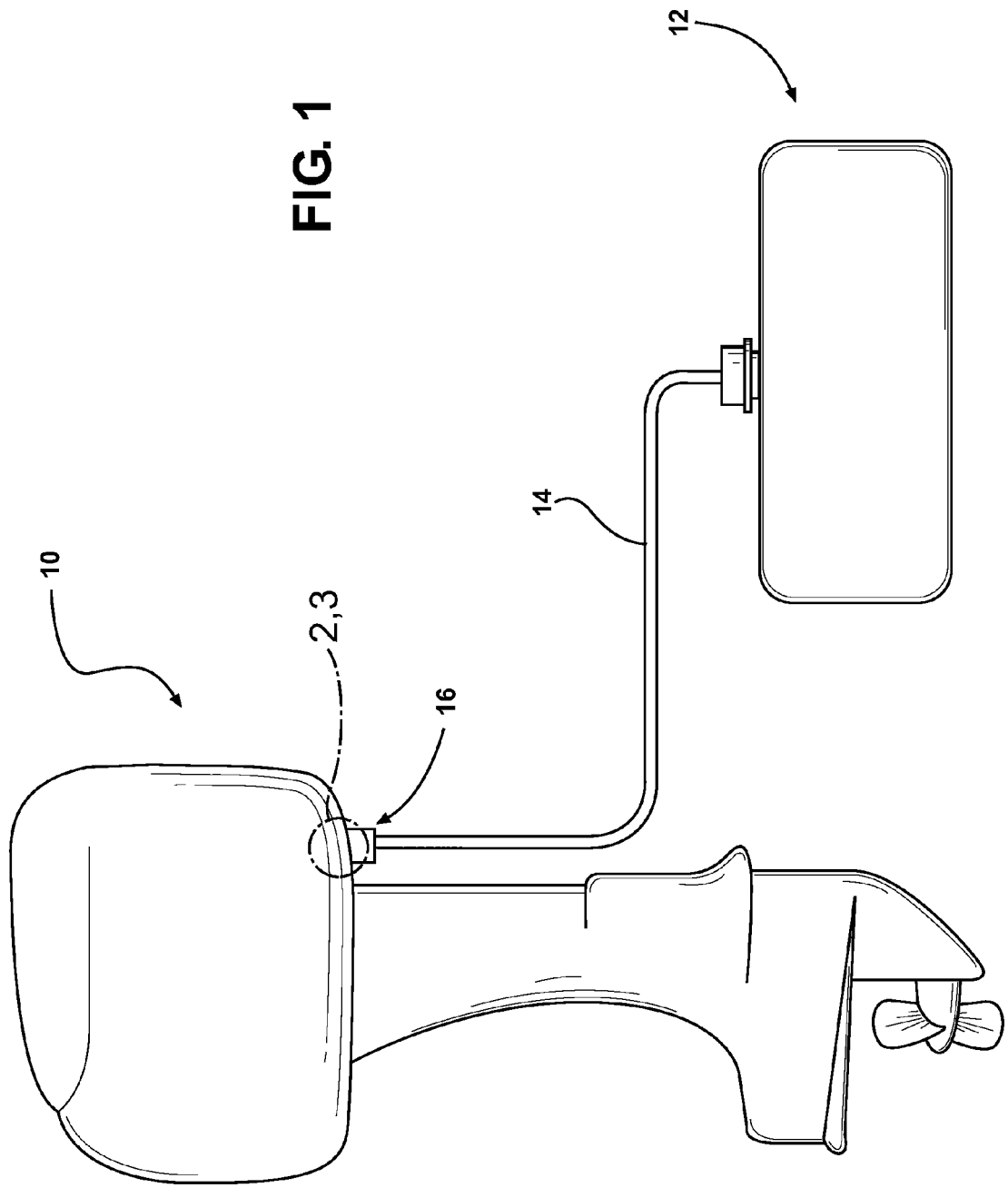
FIG. 1 is a schematic side view of an outboard marine engine a liquid fuel source in accordance with one aspect of the invention.

Referring in more detail to the drawings, FIG. 1 illustrates an outboard marine engine 10 constructed in accordance with one aspect of the invention and a separate fuel supply source 12. The fuel supply source 12, such as a standard marine fuel tank, is connected in fluid communication with the engine 10 via a fuel line 14. As is known, the fluid line 14 terminates at a fuel line connector, also referred to as fuel connector 16 (FIG. 2) that is configured for detachable fluid communication with a fuel inlet 18 of the engine 10. The engine 10 is detachably mountable to a marine vessel or boat (not shown), such that the engine 10 can be removed for service, storage, or otherwise, as desired. The engine 10 has a fuel system, including a liquid fuel reservoir, represented generally at FR, and an air intake, represented generally at AI, configured in vapor communication with one another via a vapor vent passage 20. Further, the liquid fuel reservoir FR is arranged in fluid communication with fuel injectors, as is known, and also with the fuel inlet 18 formed in a body 19 operably attached with the engine 10 via a liquid fuel passage 22 such that liquid fuel can flow from the fuel supply source 12 directly to the fuel reservoir FR, and then to the fuel injectors, as commanded by the operator. The vapor vent passage 20 includes a vapor vent control apparatus, shown generally at 24 in accordance with one aspect of the invention. The vapor vent control apparatus 24 is operable to completely close off the vapor vent passage 20 to the flow of vapor and liquid automatically upon detaching the fuel connector 16 from the fuel inlet 18 of the engine 10, and to automatically open the vapor vent passage 20 to the flow of vapor upon attaching the fuel connector 16 to the fuel inlet 18 of the engine 10. Accordingly, together, the vapor vent apparatus 24 and the fuel connector 16 provide a vapor vent control system, such that upon detaching the fuel connector 16 from the fuel inlet 18 of the engine 10, the engine 10 can be tilted and manipulated as desired and/or exposed to thermal conditions without fear of fuel vapor and liquid fuel flowing through the vapor vent passage 20 to the air intake AI of the engine 10.

Figure 2:
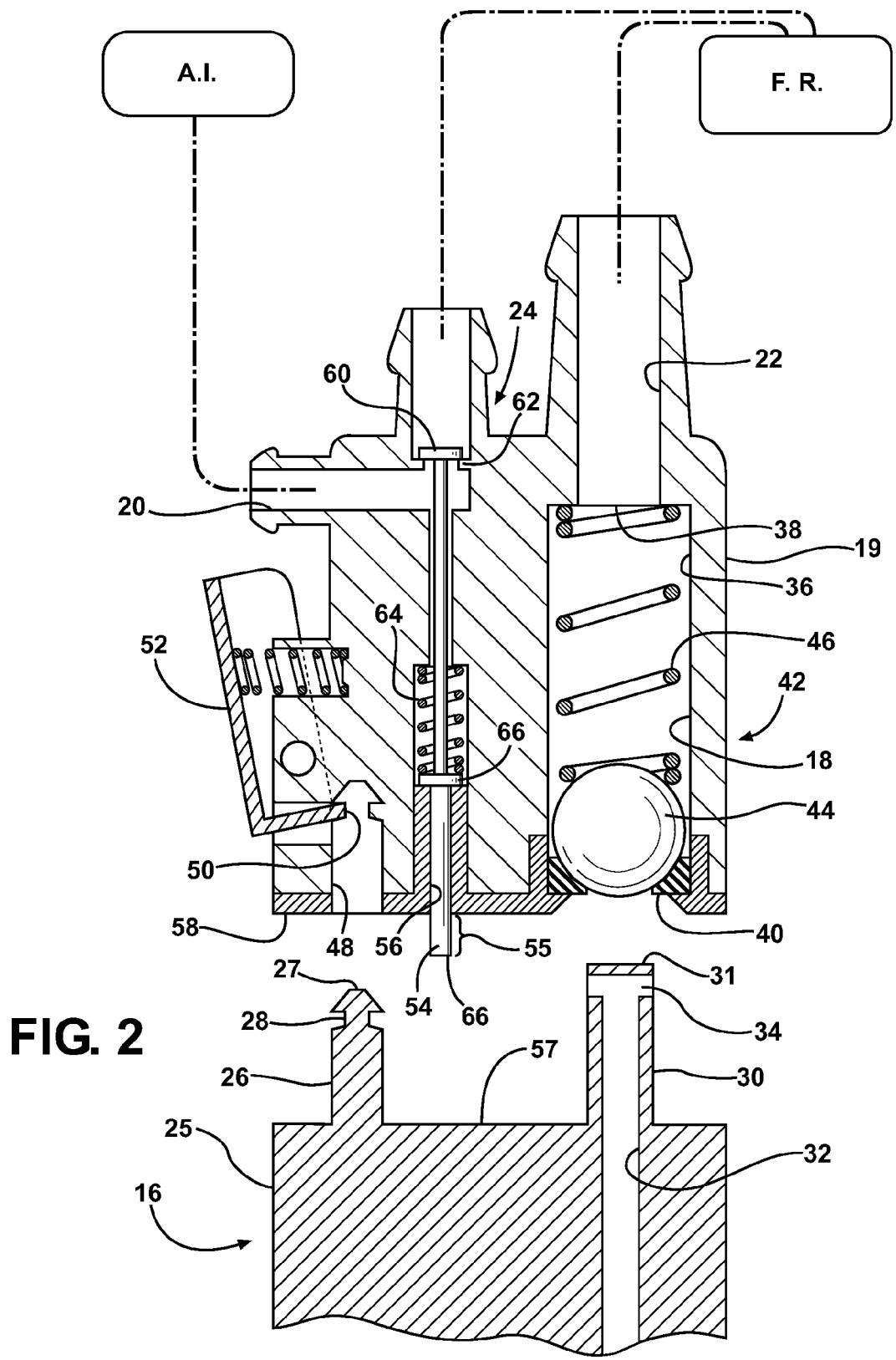
FIG. 2 is a schematic partial cross-sectional side view of a vapor vent control apparatus of the engine of FIG. 1 constructed in accordance with one aspect of the invention shown detached from a fuel connector.

Still referring to FIG. 2, the fuel connector 16 has a body 25 that can include an elongate, upstanding latch pin 26 constructed having a predetermined length extending to a free end 27. The latch pin 26 is represented here, by way of example and without limitation, as having an annular recess 28 adjacent the free end 27. Further, the fuel connector 16 has a fuel pin 30 extending parallel or substantially parallel to the latch pin 26 and spaced a predetermined distance from the latch pin 26. The fuel pin 30 is constructed having a predetermined length extending to a free end, shown here as being a closed free 31. The fuel pin 30 is represented here, by way of example and without limitation, as having a liquid fuel passage having an axially extending central portion 32 terminating at a lateral portion 34 extending generally transverse the central portion 32 adjacent the closed free end 31, thereby forming the fuel passage having a T-shape as viewed in axial cross-section.

Figure 2A:
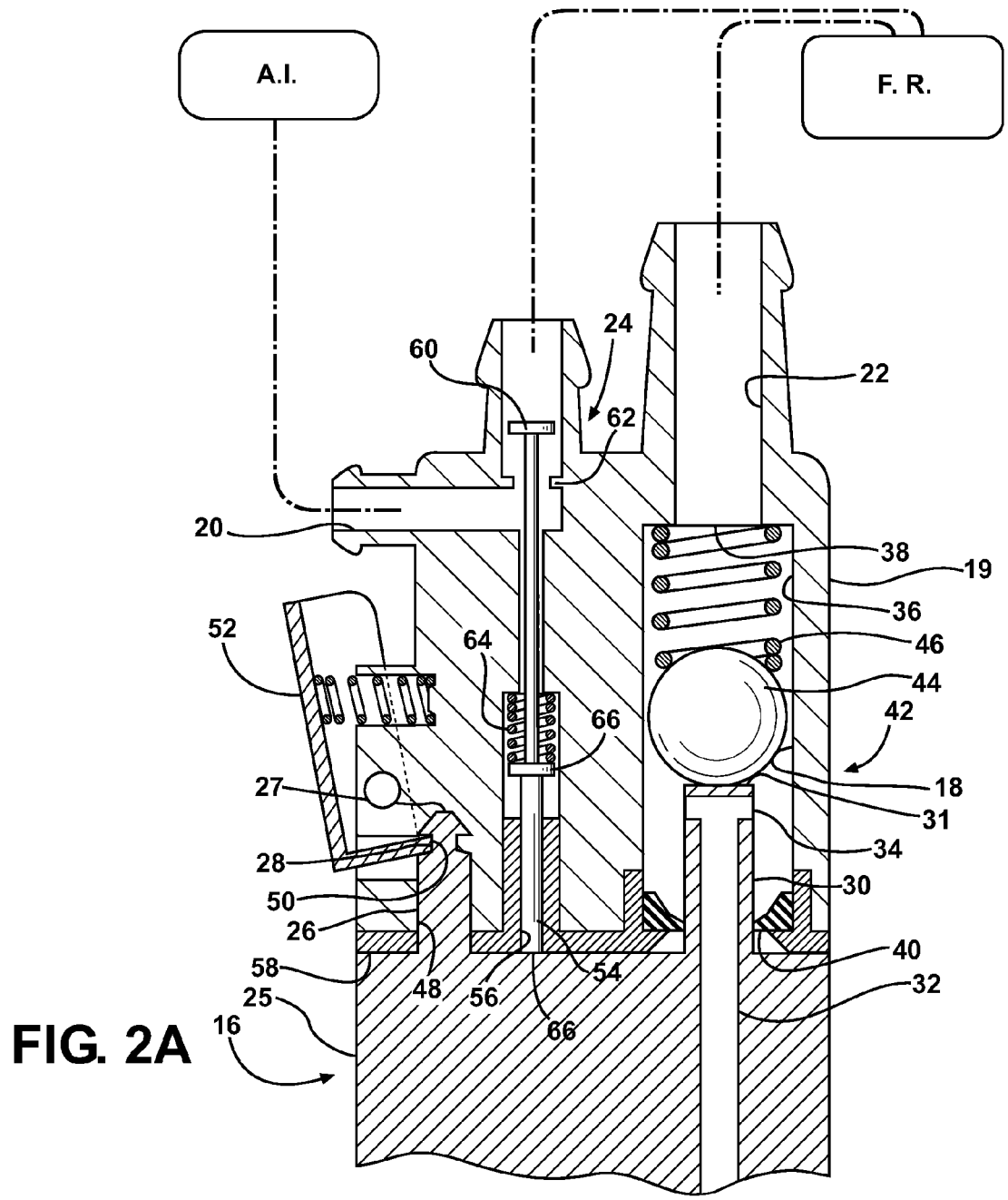
FIG. 2A is a view of the vapor vent control apparatus of FIG. 2 shown attached to the fuel connector.

The fuel inlet 18 of the engine 10 is configured for detachable connection to the fuel pin 30 of the fuel connector 16. The fuel inlet 18 is represented here, by way of example and without limitation, as having a counter bore 36 extending a predetermined distance to a radially inwardly extending shoulder 38. As shown in FIG. 2A, the depth of the shoulder 38 and the diameter of the counterbore 36 are provided to fully receive the fuel pin 30 in a clearance fit both diametrically and lengthwise. Accordingly, a clearance gap 37 is formed between the fuel pin 30 and the counterbore 36. To facilitate providing a fluid tight seal between the fuel pin 30 and the fuel inlet 18, an annular, resilient seal 40 extends radially inwardly into the counterbore 36 to at least partially close off the counterbore, with the seal 40 interfering with and flexibly engaging and forming a fluid tight seal about an outer surface of the fuel pin 30 upon receipt of the fuel pin 30 in the counterbore 36. Further, to prevent the flow of liquid fuel outwardly from the fuel inlet 18 upon detaching the fuel line connector 16 from the fuel inlet 18, a one-way valve 42 is maintained in the counterbore 36 for operable engagement and disengagement. The one-way valve 42, by way of example, can include a ball 44 of a reduced diameter from the counterbore 36 and a spring 46. The spring 46 imparts a bias against the shoulder 38 and on the ball 44 to bring the ball 44 into sealed engagement with the seal 40 upon removing the fuel pin 30 from the counterbore 36.

To facilitate releasably locking the fuel line connector 16 to the fuel inlet 18, the engine preferably has a latch pocket 48 with a predetermined diameter and depth to receive the latch pin 26 therein. The latch pocket 48 is spaced a predetermined distance from the counterbore 36 so that when the fuel pin 30 is disposed in the counterbore 36, the latch pin 26 is received in the latch pocket 48. In addition, a latch detent 50 extends into the latch pocket 48, wherein the latch detent 50 is located for receipt in the recess 28 of the latch pin 26 upon full receipt of the latch pin 26 in the latch pocket 48. Upon receipt of the latch detent 50 in the recess 28, the fuel line connector 16 is locked to the engine 10 until a latch release mechanism 52 is actuated by the operator to allow the connector 16 to be detached from the engine.

The vapor vent control apparatus 24 includes a vent pin 54 received for mechanically actuatable plunging movement in a vent pin passage 56 that extends from the vapor vent passage 20 outwardly from a body surface 58 of the engine 10. The vent pin 54 has an elongate portion 55 that extends outwardly from the body surface 58 for mechanical actuation via abutments with a surface 57 of the fuel line connector 16. The passage 56 is represented here, by way of example and without limitation, as being located between the latch pocket 48 and the counterbore 36. The vent pin 54 is automatically actuated to move to a first, open position simultaneously while attaching the fuel connector 16 with the vapor vent control apparatus 24 (FIG. 2A) and to a second, closed position upon detaching the fuel connector 16 from vapor vent control apparatus 24 (FIG. 2). When in the first, open position, the vapor vent passage 20 is open to allow fuel vapor to flow to the air intake AI and, when in the second, closed position, the vapor vent passage 20 is closed to prevent fuel vapor and liquid fuel to flow to the air intake AI. To close off the vapor vent passage 20 to fuel vapor and liquid fuel flow, the vent pin 54 has an enlarged head 60 configured for sealed abutment with a valve seat, also referred to as seal 62, fixed within the vapor vent passage 20. A spring 64 is disposed about the vent pin 54 and acts on a radially extending shoulder 66 of the vent pin 54 to bias the head 60 into sealed engagement with the seat 62 automatically upon removing the latch pin 26 from the latch pocket 48. However, upon attaching the fuel connector 16 to the engine 10, a free end 66 of the vent pin 54 is mechanically depressed by the surface 57 of the fuel connector 16, thereby causing the spring 64 to be axially compressed and the head 60 to be raised out of sealed engagement from the seat 62. When the head 60 is raised from the seat 62 (FIG. 2A), fuel vapor is free to flow about the head 60, which has a radial clearance fit within the vapor vent passage 20, and through the vapor vent passage 20. Accordingly, when the fuel line connector 16 is attached to the engine 10, the vapor vent passage 20 is able to direct fuel vapor from the fuel reservoir FR to the air intake AI. However, when the fuel connector 16 is detached from the engine 10, the vapor vent passage 20 is closed off, thereby preventing fuel vapor and liquid fuel from flowing outwardly from the reservoir toward the air intake, regardless of the engine orientation or thermal environment.

Figure 3:
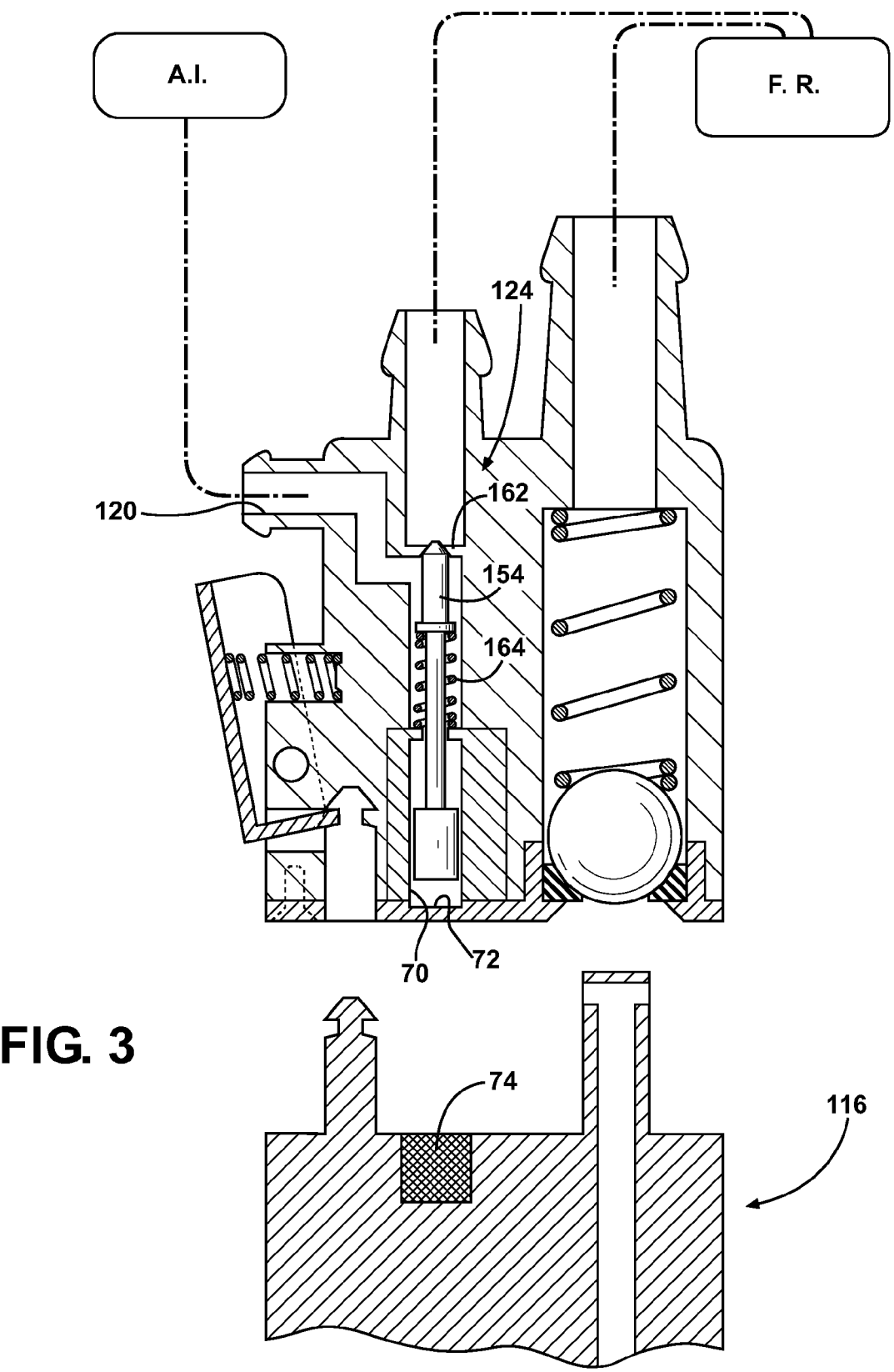
FIG. 3 is a schematic partial cross-sectional side view of a vapor vent control apparatus of the engine of FIG. 1 constructed in accordance with another aspect of the invention shown detached from a fuel connector.
Figure 3A:
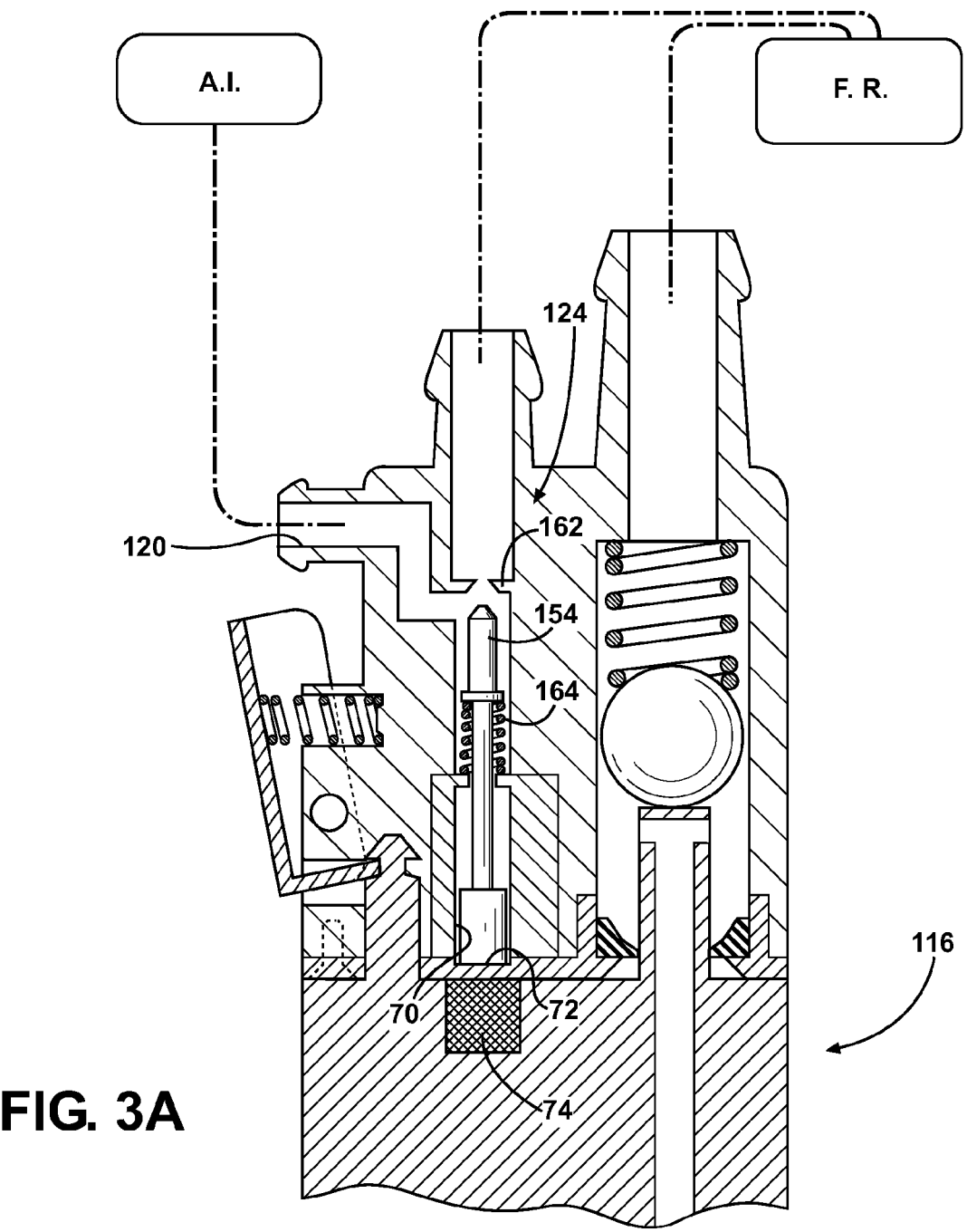
FIG. 3A is a view of the vapor vent control apparatus of FIG. 3 shown attached to the fuel connector.

In FIG. 3, a vapor vent control apparatus 124 constructed in accordance with another aspect of the invention is shown, wherein the same reference numerals as used above, offset by a factor of 100, are used to identify like features. The function of the vapor vent control apparatus 124 is the same as that described above, wherein when a fuel line connector 116 is attached to the engine 10 (FIG. 3A), a vapor vent passage 120 is automatically opened, and thus, able to direct fuel vapor from a fuel reservoir FR in the engine 10 to an engine air intake AI in the engine 10. However, when the fuel line connector 116 is uncoupled or detached from the engine 10, the vapor vent passage 120 is automatically closed off, thereby preventing fuel vapor and liquid fuel from flowing outwardly from the fuel reservoir FR toward the air intake AI, regardless of the engine orientation or thermal environment. The vapor vent control apparatus 124 has a ferrous vent pin 154 movable within a closed end pocket, also referred to as a blind pocket 70, into and out of sealed engagement with a seat 162 fixed in the vapor vent passage 120. When the fuel line connector 116 is detached from the engine 10, a spring 164, received between the vent pin 154 and a base 72 of the blind pocket 70, biases the vent pin 154 into upward sealed engagement with the seat 162, thereby closing off the vapor vent passage 120 to the flow of fuel vapor and liquid fuel. When the fuel line connector 116 is attached to the engine 10, the vent pin 154 is pulled downwardly out of sealed engagement from the seat 162 against the bias of the spring 164 by an attractive magnetic force imparted by a magnet 74 housed in the fuel line connector 116, thereby opening the vapor vent passage 120. Accordingly, the magnetic forced imparted by the magnet 74 is strong enough to overcome the spring force of the spring 164, thereby causing the spring to compress axially sufficiently to move the vent pin 154 axially out of sealed abutment with the seat 162. And so, other than the structure differences of the vapor vent control apparatus 124 illustrated and described, the function is the same as that described for the vapor vent control apparatus 24.

Obviously, many modifications and variations of the present invention are possible in light of the above teachings. It is, therefore, to be understood that within the scope of the appended claims, the invention may be practiced otherwise than as specifically described.

What is claimed is:

1. An outboard marine engine vapor vent control apparatus, comprising:
    a body configured for detachable connection to a fuel connector upstream of said body, said body having a fuel inlet configured in fluid communication with a fuel reservoir downstream of said body, said body and having a one-way valve, said fuel inlet being configured for operable attachment to a fuel pin of the fuel connector, wherein, when attached to the fuel pin said one-way valve automatically moves to an open position to allow liquid fuel to flow through said one-way valve to the fuel reservoir and when detached from the fuel pin said one-way valve automatically moves to a closed position to prevent the flow of liquid fuel out of said fuel inlet;
    a vapor vent passage extending through said body, said vapor vent passage configured to bring the liquid fuel reservoir on one side of said vapor vent passage in fluid communication with an air intake of the engine on an opposite side of said vapor vent passage;
    a vent pin passage extending from said vapor vent passage outwardly from said body; and
    a vent pin disposed in said vent pin passage, said vent pin being automatically movable between a first position upon attaching the fuel connector to said fuel inlet and a second position upon detaching the fuel connector from said fuel inlet, wherein, when in said first position said vapor vent passage is open to fuel vapor flow from the liquid fuel reservoir through said vapor vent passage to the air intake and when in said second position said vapor vent passage is closed to fuel vapor flow from the liquid fuel reservoir to the air intake.

2. The outboard marine engine vapor vent control apparatus of claim 1 wherein said vent pin is mechanically actuatable.

3. The outboard marine engine vapor vent control apparatus of claim 1 wherein said vent pin is magnetically actuatable.

4. The outboard marine engine vapor vent control apparatus of claim 1 further comprising a spring biasing said vent pin to one of said first or second positions.

5. The outboard marine engine vapor vent control apparatus of claim 1 further comprising a valve seat fixed in said vapor vent passage, said vent pin being configured to automatically move into sealed abutment with said valve seat when in said second position and out of sealed abutment from said valve seat when in said first position.

6. An outboard marine engine vapor vent control system, comprising:
    a fuel connector having an elongate fuel pin with a fuel passage;
    a body having a fuel inlet configured in fluid communication with a liquid fuel reservoir of the engine and having a one-way valve disposed therein, said fuel inlet being configured for receipt of said fuel pin, wherein, when attached to the fuel pin said one-way valve automatically moves to an open position to allow liquid fuel to flow through said one-way valve to the fuel reservoir and when detached from the fuel pin said one-way valve automatically moves to a closed position to prevent the flow of liquid fuel out of said fuel inlet;
    a vapor vent passage configured in fluid communication with the liquid fuel reservoir and an air intake of the engine;
    a vent pin disposed in said vapor vent passage, said vent pin being automatically movable between a first position upon attaching the fuel connector to said fuel inlet and a second position upon detaching the fuel connector from said fuel inlet, wherein, when in said first position said vapor vent passage being opened to fuel vapor flow and when in said second position said vapor vent passage being closed to fuel vapor flow; and
    wherein said vent pin is magnetically actuated by said fuel connector.

7. The outboard marine engine vapor vent control system of claim 6 wherein said vent pin is ferrous and said fuel connector has a magnet configured to magnetically actuate said vent pin to said first position.

8. The outboard marine engine vapor vent control system of claim 7 further comprising a spring biasing said vent pin to said second position when said body is detached from said fuel connector.

9. The outboard marine engine vapor vent control system of claim 8 wherein said magnet imparts a magnetic force sufficient to overcome a spring force of said spring when said body is attached to said fuel connector to move said vent pin to said first position.

10. The outboard marine engine vapor vent control system of claim 6 further comprising a valve seat fixed in said vapor vent passage, said vent pin being in sealed abutment with said valve seat when in said second position and out of sealed abutment from said valve seat when in said first position.

11. An outboard marine engine in combination with an external fuel tank, with a fuel line extending from the fuel tank to a fuel connector having an elongate fuel pin configured for attachment to the outboard marine engine, comprising:
 a fuel inlet configured in fluid communication with a liquid fuel reservoir of the engine, said fuel inlet being configured for receipt of said fuel pin to allow liquid fuel to flow to said fuel reservoir;
 a vapor vent passage configured in fluid communication with said liquid fuel reservoir and an air intake of the engine;
 a vent pin disposed in said vapor vent passage, said vent pin being automatically movable between a first position upon attaching the fuel connector to said fuel inlet and a second position upon detaching the fuel connector from said fuel inlet, wherein, when in said first position said vapor vent passage is open to fuel vapor flow and when in said second position said vapor vent passage is closed to fuel vapor flow; and
 wherein said vent pin is magnetically actuatable.

12. The combination of claim 11 wherein said vent pin is actuated to move to said first position by said fuel connector.

13. The combination of claim 12 wherein said vent pin is ferrous and said fuel connector has a magnet configured to magnetically actuate said vent pin to said first position.

14. The combination of claim 13 further comprising a spring disposed in said vapor vent passage, said spring biasing said vent pin to said second position when said fuel pin is detached from said fuel inlet.

15. The combination of claim 14 wherein said magnet imparts a sufficient force to move said vent pin against the bias imparted by said spring when said fuel pin is attached in said fuel inlet.

16. The combination of claim 11 further comprising a valve seat in said vapor vent passage, said vent pin being in sealed abutment with said valve seat when in said second position and out of sealed abutment from said valve seat when in said first position.

\* \* \* \* \*